June 3, 1958 R. H. ARTHUR 2,837,162

MODULAR BLOCK PUNCH SELECTOR ASSEMBLY

Filed Feb. 5, 1957 3 Sheets-Sheet 1

INVENTOR
RONALD H. ARTHUR
BY Thomas S. Ross
Joseph R. Spalla
ATTORNEYS

June 3, 1958 R. H. ARTHUR 2,837,162

MODULAR BLOCK PUNCH SELECTOR ASSEMBLY

Filed Feb. 5, 1957 3 Sheets-Sheet 2

INVENTOR
RONALD H. ARTHUR
BY Thomas S. Ross
Joseph R. Spalla
ATTORNEYS

June 3, 1958 R. H. ARTHUR 2,837,162

MODULAR BLOCK PUNCH SELECTOR ASSEMBLY

Filed Feb. 5, 1957 3 Sheets-Sheet 3

INVENTOR
RONALD H. ARTHUR
BY Thomas S. Rose
Joseph R. Spalla
ATTORNEYS 2,837,162

MODULAR BLOCK PUNCH SELECTOR ASSEMBLY

Ronald H. Arthur, West Hartford, Conn., assignor to Royal McBee Corporation, New York, N. Y., a corporation of New York Application February 5, 1957, Serial No. 638,272
9 Claims. (Cl. 164—111)

This invention relates to card punch set-up mechanisms, more particularly it relates to a modular block card punch set-up construction; and specifically it relates to a modular block card punch set-up construction having electro-magnet means for operatively selecting and readying predetermined ones of a plurality of punch selectors mounted in said construction for a card punching operation.

As is understood in the art data is stored in cards or tapes by punching holes therein; each hole or combination of holes being representative of some bit or character depending on the position on the card of said holes.

Punched tapes are usually employed in communications, for example, teletype transmission, and have holes (.072") punched therein which are smaller than the hole sizes employed in standard punched cards. The mechanisms for punching and sensing punched cards and punched tapes are therefor not compatible. That more information may be stored in a card by increasing or utilizing its maximum capacity without increasing its size is well recognized and different codes based on time and/or space arrangements have been employed to so increase a card's capacity i. e. the number of columns and rows in each column. It is also desirable that the time required to punch a card or tape be reduced i. e. it is desirable that information punching rates be increased.

A number of methods for punching cards are in use. Major ones are character-parallel/bit-serial, character-serial/bit-parallel, character-parallel/bit-parallel, and character-serial/bit-serial. In the character-parallel/bit-serial the card moves transversely beneath a longitudinal line of punches, in the character-serial/bit-parallel, the card moves longitudinally beneath a transverse line of punches, in the character-serial/bit-serial the card moves beneath an array of time responsive punches and in the character-parallel/bit-parallel the card moves intermittently past a block of orthogonally disposed punches. While all are relatively time consuming the character-parallel/bit-parallel or block punch method is considered to offer the most rapid information punching rates.

Because of the size of and spacing required between holes in standard cards now in use, the information punching rate possible with a block of standard sized punches, as compared to the information punching rate possible with a similar sized block of communication sized punches is less because, as is obvious, a unit area block will contain a lesser amount standard size punches. In order then to punch the same amount of information with a block of standard sized punches, the block must be made larger, and, as a consequence, subsequent punching operations must wait for a longer length of card to be moved beneath the block of standard sized punches. Hence, by utilizing blocks of communication sized punches a card's capacity will be increased and the rate of punching information therein will be increased.

This invention is a set-up mechanism adapted to cooperate with communication code size punches whereby more information may be stored in a unit area of card and whereby said information may be block punched in a lesser amount of time as compared to the same amount of information that can be block punched with an array of standard size punches. The invention particularly resides in a modular assembly containing a plurality of card punch selectors adapted to cooperate with punches of the size employed in perforating communication codes. Each unit in the assembly comprises a plate for carrying two columns of punch selectors, and each column is associated with a plurality of solenoid actuated plungers operatively linked to a plurality of bell crank interposers which, when actuated, prevent motion of set-up pins operatively connected to said punch selectors. With such an assembly, as will hereinafter be more fully disclosed, there is provided a device for simultaneously setting up a block of punch selectors which are adapted to cooperate with communication sized and spaced punches. Another feature of the invention resides in the fact that cards punched in accordance with the invention may be used for transmitting information without the necessity for transferring the information on the card to a tape.

An object of the invention therefor is to provide a modular block punch selector construction for enabling the simultaneous set-up of a block of punch selectors.

Another object of the invention is the provision of a small, compact, and reliable modular block punch set-up mechanism adapted to cooperate with a block of communication sized and spaced punches.

Another object of the invention is the provision of a construction wherein a plurality of punch selectors and associated set-up mechanisms are disposed to occupy a minimum of area.

Still another object of the invention is the provision of a plurality of compact planar arrays of set-up mechanisms, whereby a plurality of punch selectors may be rapidly placed in card punch selecting positions.

A further object of the invention is to provide a modular block card punch set-up mechanism for enabling the perforation of an optimum number of columns per unit area in rectangular cards adapted to receive record data items in parallel columns by a block of punches.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
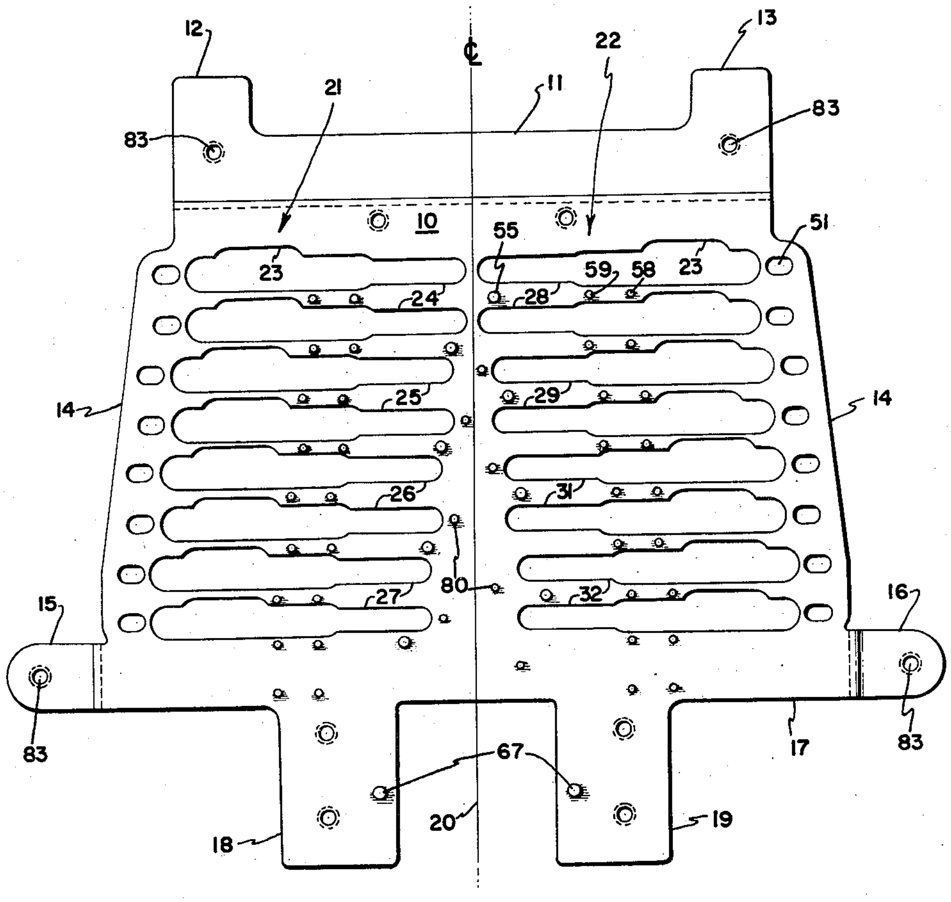
Fig. 1 is a plan view of a main support plate of a unit adapted to mount two eight row columns of punch selectors in accordance with the invention.

Referring now to the drawings, wherein like reference characters designate like or corresponding parts throughout the several views there is shown in Fig. 1 a main substantially trapezoidal flat support plate 10 adapted to be disposed in a vertical plane with its widest edge at the bottom. The plate 10 is of uniform thickness and may be stamped from a blank of permeable material such as steel or the like. As seen in Fig. 1 the top edge 11 of the plate which is provided at its corners with vertically extending rectangular extensions 12 and 13, is disposed in a plane rearward of the plane of the main plate; the side edges 14 are provided at their lower corners with rectangular extensions 15 and 16 disposed in a plane rearward of the plane of the main plate 10, and the bottom edge 17 between the side edges 14 is provided with rectangular projections 18 and 19, equally spaced on either side of a median line 20. The plate 10 is further provided with two groups of identical irregularly shaped horizontal cutouts, generally designated by reference characters 21 and 22, disposed on either side of the median line 20. Each group has an equal number of cutouts spaced vertically from each other; individual cutouts 23 in each group being opposite to corresponding cutouts in the other group. For reasons which will be apparent infra vertically adjacent pairs of cutouts 24, 25, 26 and 27 in group 21 and vertically adjacent pairs of cutouts 28, 29, 31 in group 22 are staggered from top to bottom with the result that the lowermost pairs 27 and 32 in groups 21 and 22 respectively, are displaced from the median line 20 the greatest distance. As will be described hereinafter with reference to Fig. 4 the cutouts are shaped to receive solenoid assemblies.

Figure 2:
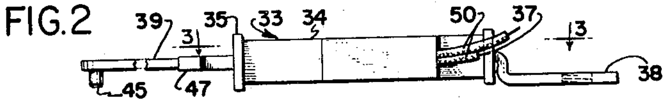
Fig. 2 is a plan view of a solenoid assembly utilized in the invention.
Figure 3:
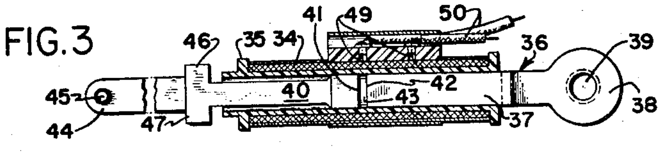
Fig. 3 is a cross sectional view of the solenoid assembly taken along lines 3—3 of Fig. 2.

Referring now to Figs. 2 and 3 there is shown a solenoid assembly generally designated by reference character 33. The solenoid assembly comprises a coil 34 wound on a form 35 of insulating material, preferably nylon. The form 35 in the embodiment shown is a hollow rectangular tube adapted to telescopically receive a solenoid pole piece 36 which is bent intermediate its ends so that portions 37 and 38 to either side of the bend are in parallel planes. The portion 37 extends into and is securely held within the form approximately midway as by a press fit. The other portion 38 is provided with a threaded hole 39 adapted to secure the solenoid assembly 33 to the main plate 10. Completing the assembly is a solenoid plunger 40 adapted to be telescopically received in sliding relation within the form 35. As seen in Figs. 2 and 3 the plunger 40 is a rectangular rod which extends into the form 35, and, in the assembled position, has its end 41 spaced a predetermined distance from the end 42 of the solenoid pole piece 36 to provide an air gap 43 which is adapted to substantially reduce the effects of residual magnetism. Adjacent its other end 44 the plunger 40 is provided with a dowel like projection 45 and is also provided on opposite edges intermediate its ends 41 and 44 with oppositely formed abutments 46 and 47. A strip of insulating material is glued or otherwise secured to the surface of the coil 34 whereby the terminal ends 49 of the coil may be insulated from one another and thereafter brought out to a terminal board or the like through leads 50. As is apparent the solenoid assemblies 33 have an outline shape substantially complementary to the shape of the staggered cutouts within which they are adapted to be mounted.

Figure 4:
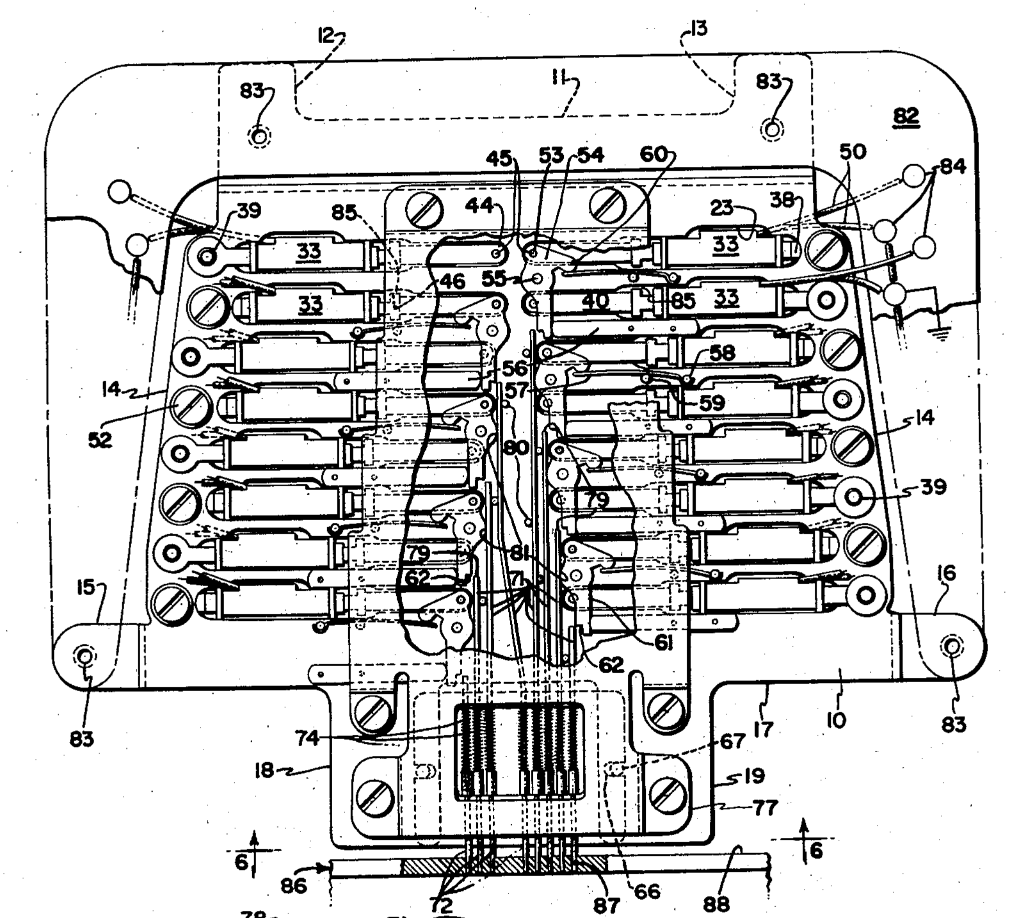
Fig. 4 is an assembled plan view of a modular punch set-up assembly with parts cut away to show the set-up mechanisms.

Referring now to Fig. 4 the solenoid assemblies 33 are placed in the horizontal cutouts 23 with the pole piece portions 38 of vertically adjacent and horizontally opposite assemblies extending to opposite sides of the main plate 10; the threaded holes 39 in the pole piece portions being in registry with oblong holes 51 (Fig. 1) formed in the main plate 10. Screws 52 or the like, extend through the oblong holes 51 and secure the pole pieces of the solenoid assemblies to the main plate. The holes 51 in the main plate 10 are made oblong so that the forms 35 and pole pieces 36 may be moved relative to the plungers 40 whereby the air gaps 43 between the plunger ends 41 and the pole piece ends 42 may be initially adjusted to a predetermined spacing. As seen in Fig. 4 the plungers are held in alignment within the forms 35 and cutouts 23 and with their ends 41 properly spaced from the ends 42 of the pole pieces 36 through insertion of their dowel like projections 45 into bores 53 formed in irregularly shaped bell crank interposers 54. The interposers are mounted for rotation on shafts 55 formed on the main plate 10. Each of the interposers 54 is biased as shown in Fig. 4, against counter clockwise rotation by a stop 56, preferably of nylon or the like to reduce noise; and against clockwise rotation by a flexible leaf spring 57 which is secured to a stud 58 formed on the main plate. The springs extend from under studs 58, over second studs 59 which are formed on the main plate, and under projections 60 on the bell crank interposers 54. The interposers are also formed with elongated extensions 61 which are provided at their ends with open notches 62 facing in a downward direction as shown in Fig. 4. As is evident the interposers 54 on each side of the median line 20 from the top down are mounted in alternate relation on opposite sides of the main support plate with the interposers on opposite sides of the median line on opposite sides of the main plate 10. As thus far described the interporsers 54 on one side of the plate are adapted to cooperate with a first column of set-up pins and punch selectors and the interposers 54 on the other side with a second parallel column; with the rows in each column in alignment. This is accomplished due to the fact that the solenoid assemblies are staggered in pairs with the interposers associated with each solenoid assembly in a pair on opposite sides of the main plate 10.

Figure 5:
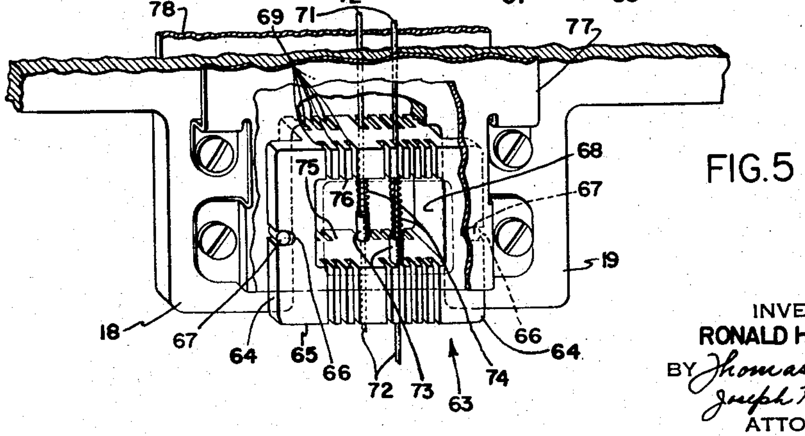
Fig. 5 is a perspective view of the set-pin and card punch selector mounting assembly of Fig. 4.

Referring now to Fig. 5, there is shown a set-up pin and punch selector mounting block generally designated by reference numeral 63, adapted to be secured to the main plate 10 between projections 18 and 19. The block is preferably formed from a phenolic resin or the like and has a substantially flat rectangular shape with flanges 64 of reduced thickness flush with and extending laterally from both sides of the front surface 65 of the block 63. The flanges are adapted to overlie the rectangular projections 18 and 19 on the main plate and are provided with cutouts 66 adapted to encompass dowels 67 projecting from the rectangular projections 18 and 19. The block also has a central rectangular cutout 68 and a plurality of oppositely disposed open vertical grooves 69 in the front and rear surfaces of the block which extend from the top and bottom edges of the block respectively, to the rectangular cutout. The grooves are equally spaced from each other a predetermined distance, except for the spacing between two of the grooves as shown in Fig. 4, to provide space for card or tape feed holes.

Adapted to be mounted in the grooves 69 on either side of the block are a plurality of set-up pins 71 and a plurality of punch selectors 72. In the specific embodiment described the diameter of the punch selectors is .042". The set-up pins and punch selectors are securely joined by cylindrical adaptors 73 whose diameter is slightly greater than the vertical grooves in the block. A plurality of cylindrical biasing springs 74 adapted to normally bias the punch selectors in a punch selecting position are placed over the set-up pins and rest against the top surface of the cylindrical adaptors.

As shown in Fig. 5 the first column of set-up pin and punch selector assemblies are placed in the grooves of the front surface with the cylindrical adaptors and biasing springs within the cutout 68. The adaptors rest on the bottom surface 75 of the central rectangular cutout 68 and the biasing springs 74 bear against the upper surface 76 of the central rectangular cutout thereby biasing the punch selectors downwardly in a punch selecting position.

With the set-up pin and punch selector assemblies mounted on the front surface of the block, the block is placed between the rectangular projections 18 and 19 extending from the main plate and a cover plate 77 is secured to the main plate as by screws to hold the block securely between the projections 18 and 19. The second column of set-up pin and punch selector assemblies are then mounted in the rear grooved surface of the block and a second cover plate 78 (Fig. 5) is mounted over said rear surface.

As may be seen from the assembled unit in Fig. 4 each of the set-up pins 71 extend vertically upward predetermined distances with the ends 79 thereof adjacent the notches 62 of associated interposers. The set-up pins are held in proper alignment between guide pins 80 formed on the main plate 10 and surfaces 81 of the interposers 54 below their associated interposers.

In operation the solenoid coils 34 are energized through the leads 50 which are connected to terminals 84 secured on a horseshoe shaped terminal board 82; the terminal board being fastened to the holes 83 in the rectangular extensions 12, 13, 15 and 16. As is understood the output of a suitable programming device, for example, typewriter keyboard actuated switches, may be electrically connected through printed circuitry on the terminal board, to the ungrounded terminals 84 on the terminal board. Energization of the solenoid coils 34 attracts associated plungers 40 toward the pole pieces 36, the flux path being from the pole pieces 36, through the main plate 10, across air gaps 85 between the main plate 10 and the abutments 46 and 47 on the plungers 40, through the plungers and air gap 43, and back to the pole pieces 36; the air gaps 85 also serving to reduce residual magnetic effects. Since the plungers 40 are operatively connected to associated interposers, their longitudinal movement causes the interposers 54 to the right of median line 20 to move clockwise and the interposers 54 to the left of the median line 20 to move counterclockwise against the tension of leaf springs 57. Such rotation of the interposers places the notches 62 at the ends thereof in line with the ends 79 of the set-up pins thereby preventing or blocking the set-up pins 71 and connected selectors 72 from rising from their punch selecting positions.

Figures 7, 8:
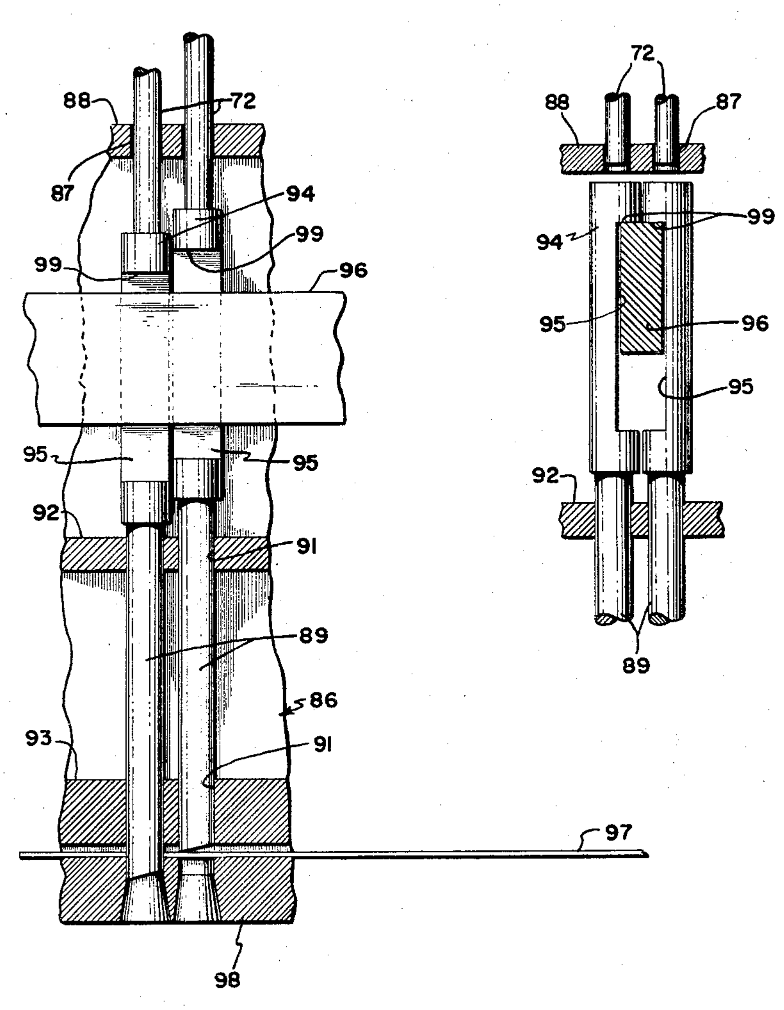
Fig. 7 is a fragmentary front view with parts in section of a punch carrying die unit in card punching position showing a selected and an unselected punch in an adjacent row.
Fig. 8 shows a fragmentary side view of two punches in adjacent columns.

Referring now to Figs. 7 and 8 there is shown a die unit generally designated by reference character 86, which is not per se part of the invention which is adapted to move vertically toward the punch selectors 72. The selectors 72 as shown in Fig. 4 are normally in register with holes 87 in the top plate 88 of the die unit. The die unit carries a block of relatively movable cylindrical punches 89, only two of which are shown in Fig. 7. The punches 89 are communication code sized i. e. .072" in diameter with their centers spaced 1/10" apart, and are mounted in guide holes 91 formed in spaced guide plates 92 and 93 of the die unit. Each punch 89 has an enlarged diameter upper portion 94 (.093" in a specific embodiment) which has a channel 95 cut therein to its centerline (Fig. 8) in order to receive a stationary stripper bar 96. As is understood cards 97 which are to be punched are fed into the die unit between guide plate 93 and a base plate 98 in synchronism with the vertical movement of the die unit. As the die unit rises, the card 97 carried thereby pushes up against the punches 89 which in turn push upward against the selectors 72. As is apparent the card will be punched by those punches prevented from further vertical movement by blocked selectors 72 but not by those punches not so prevented by selectors free to move, which punches continue to be urged upwardly by the card against the punch selectors and against the tension of biasing springs 74. After each block is punched the die unit comes down and the punches are pulled out of the card by the stationary stripper bar 96 which engages the undersurfaces 99 (Fig. 8) of the channels in the punches as they come down under urging by the top plate 88 of the die unit. Thereafter other cards may be punched with the same information or the solenoids or selected ones may be de-energized thereby enabling the leaf springs to rotate right and left, the interposers clockwise and counter clockwise respectively whereby the plungers are pulled back out to normal position. Thereafter the de-energized solenoid coils may be again energized in accordance with another desired set-up.

Figure 6:
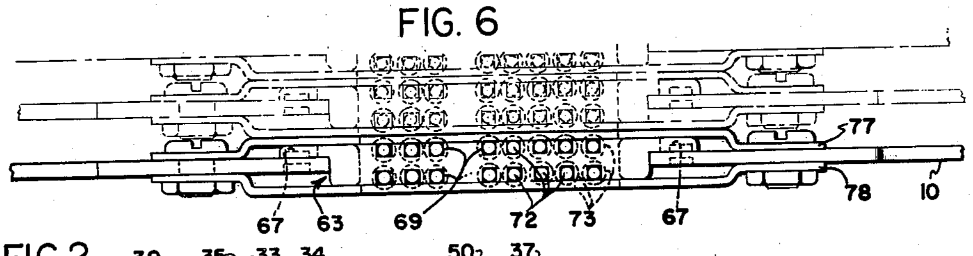
Fig. 6 is a view of the modular assembly taken along lines 6—6 of Fig. 4 further showing a plurality of stacked units.

As is understood a plurality of two column modular blocks may be connected in side by side relation to achieve column-wise expansion as shown in Fig. 6; and row-wise expansion could be achieved by a redesign of the plate assemblies in accordance with the invention.

It is apparent then that the invention as above described provides a construction enabling the simultaneous setting up of a block of communication sized punches wherein the spacing between the center line of punches in adjacent rows and columns is 1/10 inch.

While the exemplary embodiment describes a modular block punch set-up mechanism utilizable in combination with a punch carrying die unit in order to enable a more simply fabricated unit wherein the dimensions are less critical and whereby the possibilities of jamming and misalignment are reduced i. e. the .042" diameter selectors cooperate with the .093" diameter of the enlarged portions of the punches, it is to be understood that the punch selectors 72 themselves may be utilized as punches for perforating a card or tape directly by making the selectors the proper diameter i. e. .072".

It should be understood, therefore, that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. A modular block punch set-up mechanism for selecting punches adapted to perforate record cards in communication sized and spaced codes comprising a mounting plate having a plurality of horizontal cutouts horizontally spaced and staggered in a vertical plane, a plurality of laterally movable means mounted within said cutouts, a plurality of interposers mounted for rotation in vertical planes on opposite sides of said plate operatively connected to said movable means, said interposers on each side of said plate being staggered in spaced horizontal planes, the interposers on each side being alternately disposed; a plurality of aligned punch set-up means mounted on either side of said plate adapted to be moved in an upward direction, means for biasing said last named means against upward movement, said interposers being adapted when rotated to block the upward movement of said punch set-up means, current responsive means for selectively actuating said laterally movable means whereby said interposers block the upward movement of said set-up means, and a vertically movable punch associated with each of said punch set-up means whereby punches associated with blocked set-up means are held in a card perforating position while those not associated with blocked set-up means are moved out of card perforating position by the card to be perforated.

2. A modular block punch set-up construction comprising an array of columnar assemblies, each of said columnar assemblies comprising a mounting plate, a plurality of punch selectors aligned in vertical planes on opposite sides of said plate and means for selecting and putting predetermined ones of said punch selectors in a punch selecting position, said means comprising a plurality of set-up pins coupled at one end to said punch selectors, means cooperating with said set-up pins and punch selectors for biasing said selectors to a punch selecting position, a plurality of interposers disposed in vertical planes on opposite sides of said plate, said interposers on each side of the plate being staggered in parallel horizontal planes, one each of said set-up pins having its free end extending vertically and adjacent one of said interposers, a vertically movable punch associated with each of said punch selectors, said interposers being adapted when actuated to engage the free ends of said set-up pins to prevent vertical movement of said pins, and means for actuating predetermined ones of said interposers whereby those set-up pins and selectors associated with an actuated interposer are held in a punch selecting position while those not so associated with an actuated interposer may be moved out of punch selecting position during a punching operation, whereby said punches associated with selectors in a punch selecting position are held in a card perforating position.

3. A modular block punch set-up mechanism comprising a flat mounting plate disposed in a vertical plane, a plurality of pairs of spaced and staggered horizontal cutouts in said plate, solenoid actuated plungers mounted for movement within said cutouts, a plurality of interposers mounted for rotation in vertical planes operatively connected to said plungers, the interposers associated with a pair of cutouts being on opposite sides of said plate, aligned upwardly movable punch selector means on each side of said plate, means for biasing said punch selector means to a punch blocking position, said interposers when rotated preventing movement of said selector means from their biased position, a vertically movable punch associated with each of said punch selector means, and solenoid means for selectively actuating said plungers to thereby rotate said interposers to a punch selector means blocking position, whereby said punches associated with blocked selector means are held in a card perforating position.

4. In combination with a vertically moving punch and die unit adapted to carry record cards or tapes which are to receive record data items in parallel columns across the shorter dimensions thereof, a modular block punch set-up construction for selecting punches adapted to perforate said record cards or tapes, said construction comprising a vertically disposed mounting plate, columnar assemblies mounted on both sides of said plate, each of said columnar assemblies comprising a plurality of aligned punch selectors and means for selecting and readying predetermined ones of said selectors for a perforating operation, said means comprising a plurality of set-up pins connected at one end to said selectors, means cooperating with said set-up pins and selectors for normally biasing said selectors to a card punch selecting position, a plurality of rotatably mounted interposers staggered in parallel horizontal planes on each side of said plate, one each of said set-up pins having its free end extending vertically and adjacent one of said interposers, said interposers being adapted upon rotation to engage the free ends of their associated set-up pins to prevent vertical movement of said pins, resilient means for biasing said interposers against rotation, and means for rotating predetermined ones of said interposers whereby when said punch and die unit moves vertically toward said selectors those set-up pins and selectors associated with an actuated interposer remain in a card punch selecting position while those not so associated with an actuated interposer are moved out of card punch selecting position by the card on the die unit.

5. The invention as recited in claim 4 wherein said means for rotating said interposers comprises solenoid actuated plungers.

6. In combination with a vertically moving punch and die unit adapted to carry record cards or tapes which are to receive record data items in parallel columns across the shorter dimension thereof, a modular block punch set-up construction for selecting punches adapted to perforate said record cards or tapes having a vertical planar array of columnar punch selector assemblies, each of said assemblies comprising a mounting plate, a plurality of aligned punch selectors on either side of said plate, and means for selecting and readying predetermined ones of said punch selectors for a perforating operation, said means comprising a plurality of set-up pins connected at one end to said punch selectors, means cooperating with said set-up pins and punch selectors for biasing said punch selectors to a card punch selecting position, a plurality of interposers staggered in parallel horizontal planes on opposite sides of said plate, one each of said set-up pins having its free end extending vertically and adjacent one of said interposers, said interposers being adapted to engage said free ends of said set-up pins when actuated to prevent vertical movement of said pins, and means for actuating predetermined ones of said interposers whereby when said die unit moves vertically toward said punch selectors those set-up pins and punch selectors associated with an actuated interposer remain in a card punch selecting position while those not so associated with an actuated interposer are moved out of card punch selecting position by the card on the die unit.

7. In combination with a movable die unit having a plurality of punches mounted therein for movement relative to said die unit, said die unit being adapted to carry a record which is to be perforated by said punches, a modular block punch set-up construction for limiting or permitting movement of said punches relative to said die block whereby those punches whose movement is limited perforate the record and those punches whose movement is permitted are moved by the card being perforated; said mechanism comprising a vertically disposed mounting plate, a plurality of pairs of spaced and staggered horizontal cutouts in said plate, laterally movable means mounted within said cutouts, a plurality of interposers rotatably mounted on said plate and operatively connected to said laterally movable means, upwardly movable punch selector means normally biased in a punch limiting position, said interposers when rotated preventing movement of said punch selector means from their biased position, and means for selectively actuating said laterally movable means to thereby rotate said interposers.

8. A modular block punch mechanism adapted to block punch record cards in communication sized and spaced codes comprising a mounting plate having a plurality of cutouts horizontally spaced and staggered in a vertical plane, a plurality of laterally movable members mounted within said cutouts, a plurality of interposers rotatably mounted on opposite sides of said plate operatively connected to said movable members, said interposers on each side of said plate being staggered in spaced horizontal planes with the interposers on each side being alternately disposed, card punching means including a plurality of aligned card punches mounted on either side of said plate adapted to be moved in an upward direction by a card to be perforated, said interposers being adapted when rotated to block the upward movement of said card punching means, means for selectively moving said laterally movable members whereby associated interposers are rotated into the path of movement of and block the movement of said card punching means, whereby when said modular block punch mechanism is moved relative to said card, said punches associated with blocked punching means will perforate said card and said punches not associated with blocked card punching means will be moved by the card being perforated.

9. A modular block punch mechanism adapted to block punch record cards carried by a relatively movable die block in communication sized and spaced codes comprising; a plurality of parallel mounting plates, a column of aligned communication sized and spaced punches movably mounted on either side of each of said plates for movement out of a card perforating position, means normally biasing said punches in card perforating positions, and means on said plates for selectively blocking the movement of said punches from a card perforating position, whereby as said mechanism and card are moved relative to one another those punches blocked will perforate the record and those punches not blocked will be moved out of card perforating position by the card being perforated.

No references cited.